United States Patent [19]

de Boer

[11] Patent Number: 4,594,871

[45] Date of Patent: Jun. 17, 1986

[54] REEL TYPE CONTINUOUS MARINE PIPE LAYING SYSTEM

[75] Inventor: Nico de Boer, Kenner, La.

[73] Assignee: McDermott, Inc., New Orleans, La.

[21] Appl. No.: 626,708

[22] Filed: Jul. 2, 1984

[51] Int. Cl.⁴ .............................................. B21D 3/02
[52] U.S. Cl. ...................................... 72/164; 72/160; 405/168
[58] Field of Search .................... 72/160, 161, 164; 405/166, 168; 242/78.6, 78.7, 78.8

[56] References Cited

U.S. PATENT DOCUMENTS

| | | | |
|---|---|---|---|
| 2,720,242 | 10/1955 | Siegerist | 72/162 |
| 2,979,109 | 4/1961 | Dieckmann | 242/78.8 |
| 3,237,438 | 3/1966 | Tesson | 72/160 |
| 3,422,652 | 1/1969 | Lorenz | 72/164 |
| 3,442,108 | 5/1969 | Müller | 72/164 |
| 3,765,210 | 10/1973 | Lemper | 72/164 |
| 3,834,204 | 9/1974 | Ihle | 72/161 |
| 3,855,835 | 12/1974 | Tisdale, III | 72/183 |
| 3,872,680 | 3/1975 | Nicholson et al. | 61/72.3 |
| 4,137,744 | 2/1979 | Smick | 242/78.6 |
| 4,157,023 | 6/1979 | Tisdale | 72/161 |
| 4,410,297 | 10/1983 | Lynch | 405/164 |

FOREIGN PATENT DOCUMENTS

| | | | |
|---|---|---|---|
| 2848044 | 5/1980 | Fed. Rep. of Germany | 242/78.6 |
| 822816 | 1/1938 | France | 72/160 |
| 12875 | of 1898 | United Kingdom | 405/166 |
| 893295 | 12/1981 | U.S.S.R. | 242/78.6 |

*Primary Examiner*—Daniel C. Crane
*Attorney, Agent, or Firm*—Arnold, White & Durkee

[57] ABSTRACT

A continuous marine pipe laying system utilizes two rollers to overbend and straighten pipe as it is unwound from a reel. A support arm is pivotally connected to the axis of rotation of said reel and first and second roller arms are pivotally connected to the support arm at a point spaced from said axis of rotation. During use, the first roller is positioned at a point adjacent the pipe substantially opposite the departure point of the pipe from the reel. The second roller is spaced from the first roller so as to create an appropriate overbend to straighten the pipe and is maintained at that spacing as successive layers of pipe are unwound from the reel.

13 Claims, 3 Drawing Figures

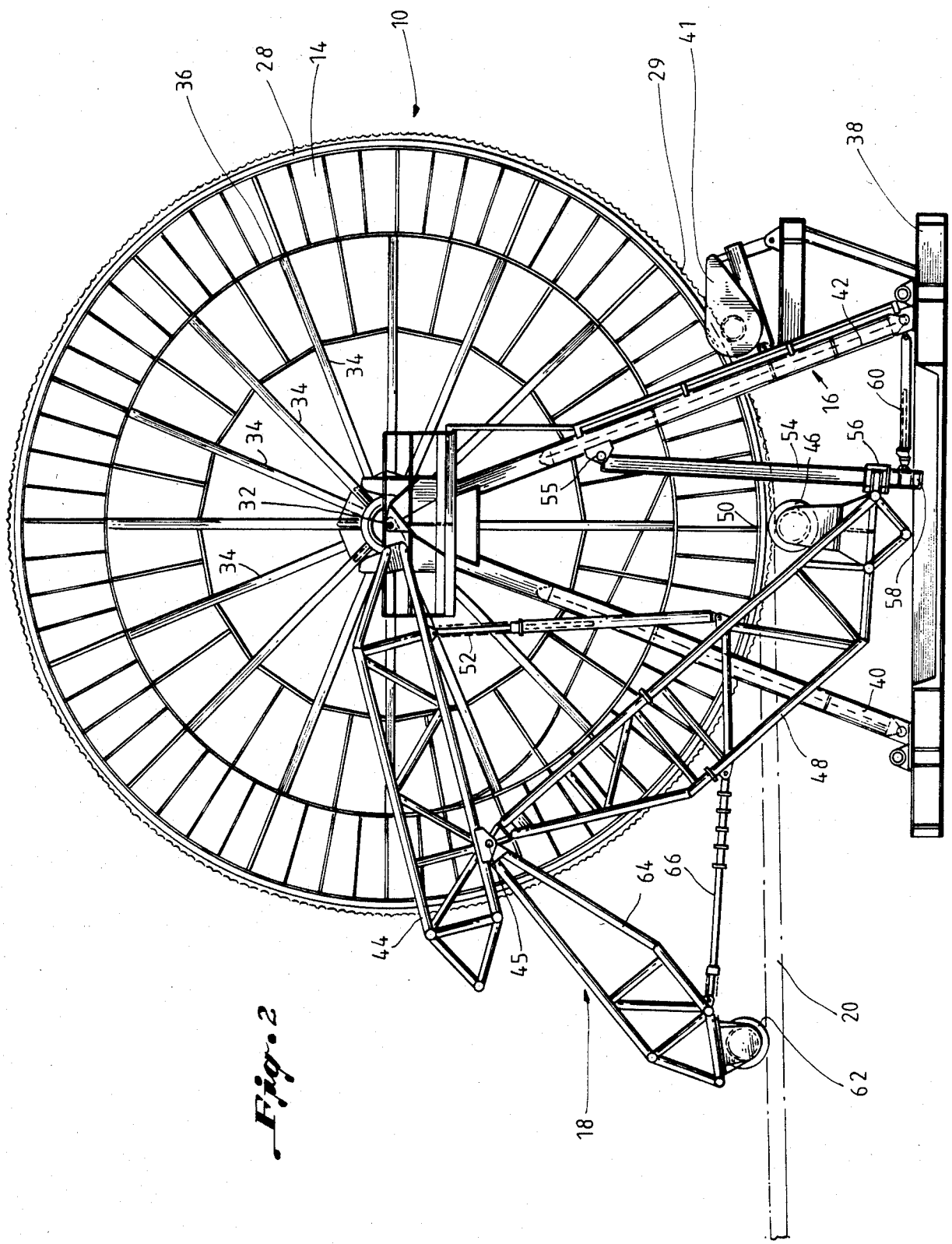

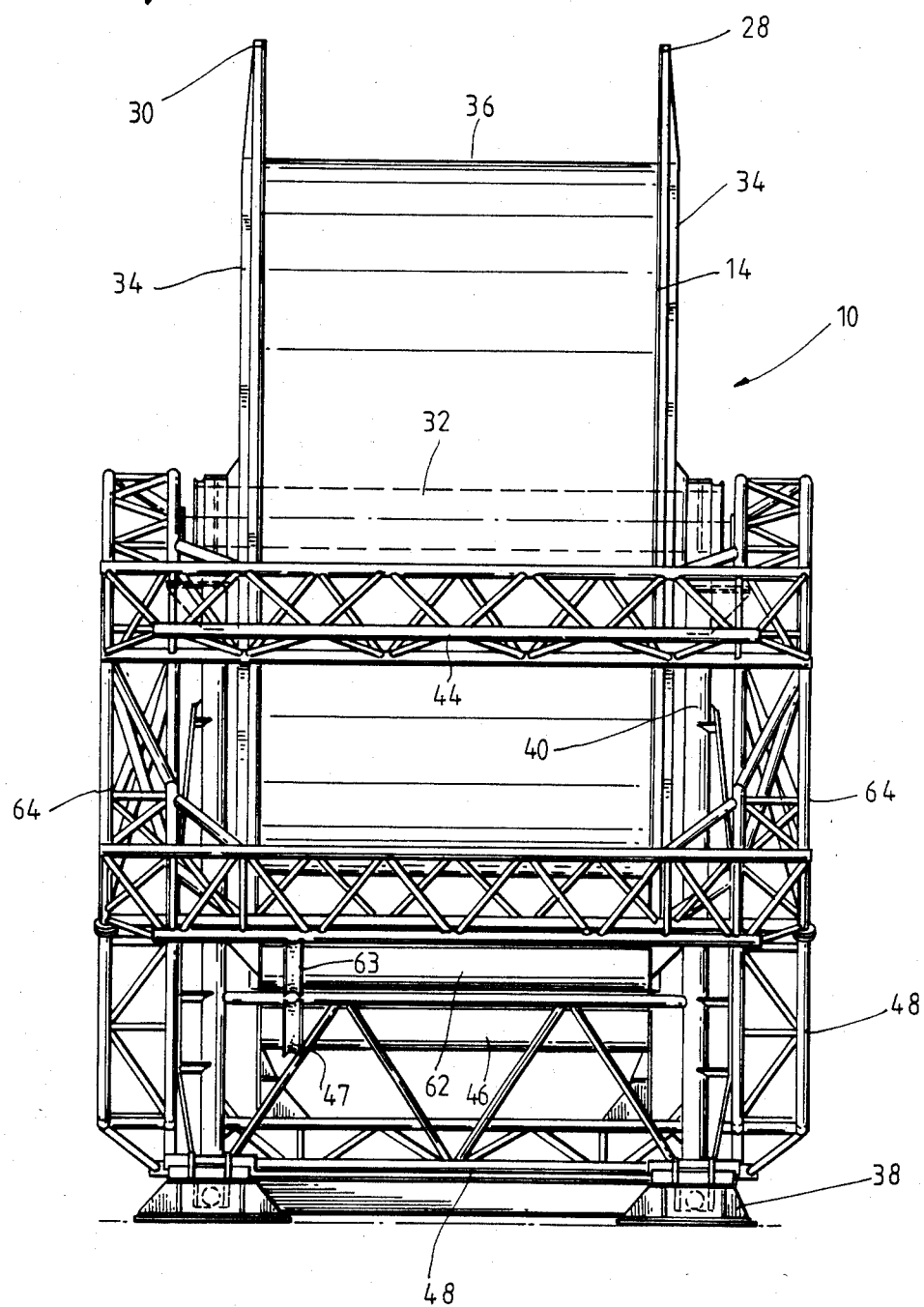

REEL TYPE CONTINUOUS MARINE PIPE LAYING SYSTEM

BACKGROUND

The present invention relates to systems for continuously laying marine pipelines and, more particularly, it is directed to reel pipe laying systems having means for straightening the pipe as it is uncoiled.

Marine pipelines are generally buried in the soil on the ocean floor to protect them from strong currents and objects which can damage the pipelines such as anchors or fishing lines. The pipeline is generally lowered to the ocean floor from a barge or some other type of marine vessel.

The pipe is formed in mill length sections which are connected together on the surface and are lowered to the bottom of the ocean as a continuous pipeline from a barge. There are generally two methods of forming and laying the continuous pipe. The first method involves the welding together of the various lengths of pipe on the barge immediately prior to their being introduced into the water. The second method involves welding numerous sections of pipe together and winding them onto a large reel. This reel is then placed on the barge and the pipe is unwound and deposited on the ocean floor. With this type of method, it is necessary to provide some means for straightening the pipe to remove the curvature which is created as the pipe is wound on the reel.

Various systems have been devised for removing the curvature encountered in reel pipe laying systems. For example, U.S. Pat. No. 3,872,680 to Nicholson et al. discloses a five roller system designed to straighten the pipe as it comes off the reel. Four of the rollers are fixed and one roller is movable to create the proper overbend. The entire system is mounted on the deck and is positioned with respect to the reel such that the pipe can be unwound from either the top or the bottom of the reel.

Another deck mounted system for straightening pipe is disclosed in U.S. Pat. No. 3,855,835 to Tisdale, III et al. This patent discloses a system which includes two sets of rollers which are positioned on the deck of the vessel and are adjustable with respect to the position of the reel to reverse bend the pipeline as it is unwound.

U.S. Pat. No. 4,410,297 to Lynch discloses a two roller system in which the rollers are connected to the rotational axis of the reel by a yoke. The roller nearest the reel is mounted on a pair of arms which are controlled by linear actuators which can be adjusted for different pipe diameters and for positioning with respect to successive layers of pipe on the reel. In that system, some adjustments have to be made as successive layers of pipe are removed to maintain the proper departure angle and overbend.

In prior art systems, a substantial amount of force is necessary to pull the pipe from the reel and through the straightening system. This complicates the procedure in those pipe laying systems in which the pipe is laid under tension utilizing an underwater plow to form a ditch and guide the pipeline into the ditch. In underwater plow systems there is a delicate balance between the amount of force necessary to remove and straighten the pipe and the amount of force necessary to create the proper tension in the line to form an appropriate catenary curve in the pipeline without having it extend too far behind the barge before the pipeline reaches the ocean bottom. When the proper balance is achieved, such systems including that of U.S. Pat. No. 4,410,297, offer desirable advantages.

Accordingly, it would be an advancement in the art, including over the system of U.S. Pat. No. 4,410,297 to provide a system for straightening marine pipe as it is unwound from a reel on a barge in which the amount of force necessary to straighten the pipe is reduced and which can easily be adjusted to accommodate different pipe sizes and departure angles. Such a system is disclosed and claimed herein.

SUMMARY OF THE INVENTION

The present invention provides a system for continuously laying marine pipeline from a reel located on a barge or other type of marine vessel. The system includes two straightening rollers which, in the preferred embodiment, are mounted on a series of pivotable arms coupled to the reel from which the pipeline is removed. The first roller is positioned at a point substantially opposite the departure point where the pipe leaves the reel. The second roller is spaced from the first roller, a suitable distance, so as to create the proper overbend to straighten the pipe such that it leaves the system in a rectilinear configuration.

As successive layers of pipe are unwound from the reel, the first roller is adjusted inwardly with respect to the reel so as to maintain its position adjacent the pipe opposite the departure point. As the position of the first roller is changed, the position of the second roller is automatically adjusted so as to maintain the proper overbend.

This automatic adjustment is accomplished in the preferred embodiment by supporting each roller on the end of a roller arm which is pivotally connected to a support arm at a point outboard from the axis of rotation of the reel. Accordingly, the two rollers and the pivot point form the corners of an imaginary triangle which is held substantially constant during use. The ends of the roller arms supporting the rollers are held in a fixed relationship by an adjustable arm connected between the roller arms. The support arm to which the roller arms are connected is pivotally connected to the axis of rotation of the reel such that the inner roller can be maintained at its position adjacent the pipe opposite the departure point as successive layers of pipe are removed.

BRIEF DESCRIPTION OF THE DRAWINGS

Reference is next made to the drawings in which like parts are designated with like numerals throughout, and in which:

FIG. 2 is a side elevational view of a preferred embodiment of the present invention.

FIG. 3 is an end elevational view of a preferred embodiment of the present invention.

DETAILED DESCRIPTION OF THE PREFERRED EMBODIMENT

Figure 1:
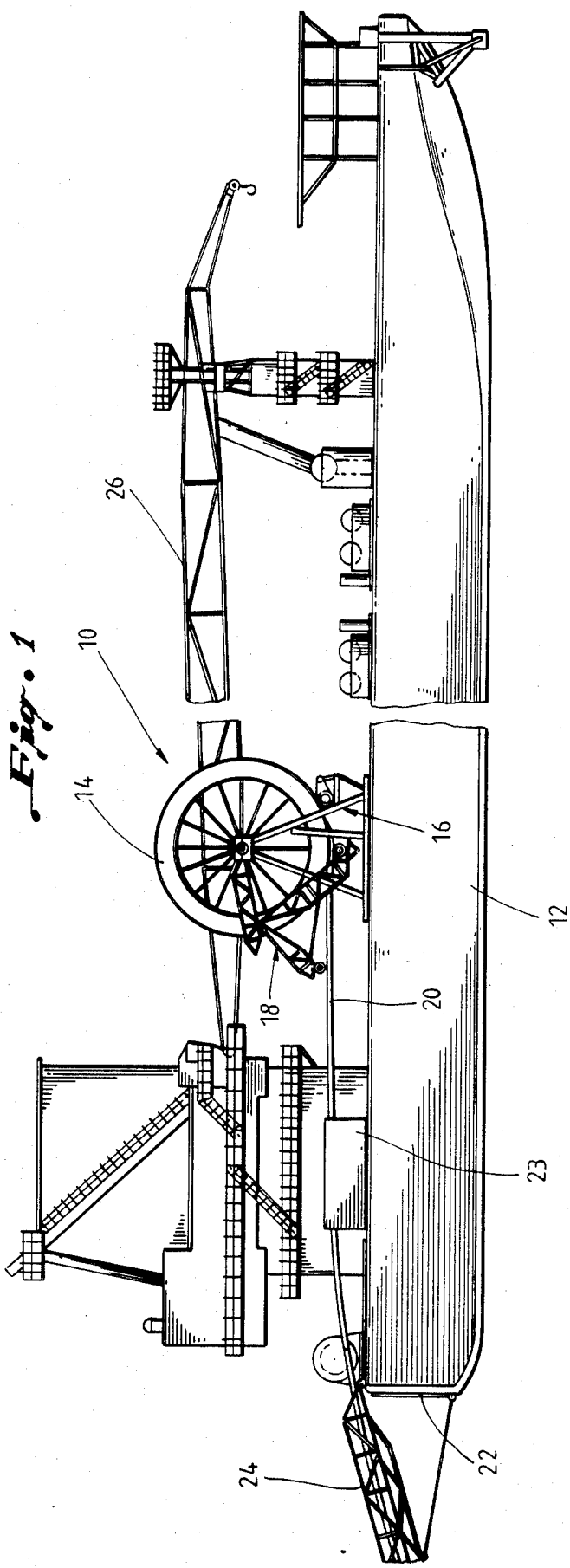
FIG. 1 is a broken elevational view of the present invention mounted on a pipe laying barge.

The present invention provides a system for continuously laying a marine pipeline from a barge or other type of marine vessel. While reference is generally made to marine pipelines, it is understood that the system also applies to pipelines laid under other types of navigable bodies of water such as rivers and lakes.

With reference first to FIG. 1, the pipe laying system of the present invention, generally designated at 10, is mounted on a barge 12. System 10 includes a large reel 14 which, in the preferred embodiment, is mounted on barge 12 by a support frame 16.

A straightener 18 is coupled to reel 14 to overbend pipe 20 as it is unwound from reel 14 to remove the curvature from the pipe. After the pipe has been straightened, it is discharged from the stern 22 of barge 12 through a stinger 24 which prevents the pipe from buckling as it enters the water.

Under most circumstances, marine pipelines are laid under tension. In these situations, a tensioning apparatus, indicated schematically at 23, of the type known in the art and having inflatable tires or a treadlike belt to engage the pipe is positioned between system 10 and stinger 24 to pull the pipeline from the reel and create the proper tension in the pipeline to form a suitable catenary curve to direct the pipeline to the ocean floor.

A crane 26 is provided to lift and position reel 14 in the pipe laying system. In practice, several large reels with pipe wound upon them may be loaded onto barge 12. After the pipe is unwound from one reel, crane 26 can be utilized to exchange the empty reel with a full reel so that the pipe laying can continue without substantial interruption. Tensioning apparatus 23 can be used to hold the end of pipe 20 when the reels are being changed.

Referring now to FIGS. 2 and 3, the pipe laying system 10 of the present invention is illustrated in greater detail. Reel 14 is formed from a pair of spaced apart rims 28 and 30 (see FIG. 3) which are supported from an axle 32 by a plurality of spokes 34. Axle 32 defines the axis of rotation of reel 14. A base plate 36 is supported by spokes 34 between axle 32 and rims 28 and 30. Base plate 36 forms a pipe support surface upon which pipe 20 is wound. As a layer of pipe is formed on base plate 36, it in turn forms the pipe support surface for the next layer.

As can be seen from FIG. 3, system 10 is symmetrical about a plane which is perpendicular to the axis of rotation of reel 14. Accordingly, in the following description system 10 will generally be described with reference to the side illustrated in FIG. 2 and it should be understood that corresponding elements exist on the opposite side of system 10 unless otherwise specified.

Reel 14 is supported above the deck of the barge by the reel support frame 16 which is mounted on a skid beam 38. Frame 16 includes a pair of support legs 40 and 42 which are detachably coupled to axle 32 at one end.

A hydraulic motor 41 is attached to leg 42 to provide a means for braking reel 14 as pipe 20 is pulled from the reel such that tension is created in pipe 20. Motor 41 includes a pinion gear for engaging real gear 29 which extends around rim 28.

The straightener 18 is mounted on support frame 16 such that it can straighten the pipe 20 as it is unwound from reel 14. A U-shaped support arm 44 is hinged to frame 16 in alignment with axle 32 with one leg of the support arm being positioned on each side of reel 14. Accordingly, support arm 44 can rotate around reel 14 to adjust the departure angle of pipe 20 as it is unwound and straightened. This also allows pipe 20 to be discharged from the bottom of reel 14 as illustrated or, by rotating the system 180 degrees about a vertical axis and by raising straightener 18, pipe 20 can be discharged from the top of reel 14.

Straightener 18 includes an inner roller 46 which is designed to extend across the entire width of reel 14 between rims 28 and 30. Roller 46 is connected to support arm 44 by a roller arm 48. Roller arm 48 is configurated and is hinged to support arm 44 at 45 such that roller 46 can be positioned adjacent pipe 20 opposite the departure point 50 where pipe 20 leaves reel 14. As successive layers of pipe 20 are unwound from reel 14, roller 46 is moved inwardly between rims 28 and 30 such that it remains adjacent pipe 20 substantially opposite the departure point. While it is desirable to maintain roller 46 as close as possible to the point directly opposite the departure point, it will be appreciated that anything within about two pipe diameters along the length of the pipe would be considered to be substantially opposite the departure point.

In the preferred embodiment, this inward movement of roller 46 is accomplished by means of jack screw 52 which is connected to support arm 44 and to roller arm 48. In the preferred embodiment, jack screw 52 is operated by a hydraulic drive and is maintained under tension during operation. It will, of course, be appreciated by those skilled in the art that jack screw 52 could also be operated by mechanical or electrical drive units and that other types of adjustable arms could be used.

A guide beam 54 is positioned between support leg 42 and skid beam 38 to guide roller 46 as it moves inwardly. In the preferred embodiment a slide 56 is positioned on the end of roller arm 48 and slides up guide beam 54 during operation.

Guide beam 54 is hinged to support leg 42 at 55 and is connected to skid beam 38 by means of a clevis 58. A jack screw 60 connects the lower end of guide beam 54 to the lower end of support leg 42. By adjusting jack screw 60, the angle of guide beam 54 with respect to frame 16 can be adjusted, thereby adjusting the departure angle of pipe 20 from pipe laying system 10. In the preferred embodiment, jack screw 60 is also hydraulically operated.

It has been found that the amount of force required to pull pipe 20 off reel 14 and remove the curvature is less when the first roller is adjacent the pipe opposite the departure point as compared to the prior art systems. Accordingly, this embodiment facilitates the balancing of forces necessary to straighten the pipe and to lay the pipe under tension.

An outer, overbend roller 62 is supported by a roller arm 64 which is also hinged to support arm 44 at 45. Roller 62 is also designed to extend across the entire width of reel 14. Accordingly, no lateral adjustment of the rollers is needed as pipe 20 is unwound. However, in order to preserve the protective coating on pipe 20, floating sheaves 47 and 63 are placed on rollers 46 and 62 respectively (see FIG. 3).

Roller arm 64 is connected to roller arm 48 by means of a hydraulically operated jack screw 66. As jack screw 66 is lengthened, the position of roller 62 is raised with respect to the position of roller 46. This allows straightener 18 to accommodate larger diameter pipes. It also decreases the overbend which is applied to pipe 20. During use, jack screw 66 is held in tension between roller arms 48 and 64. Of course, other types of adjustable arms could be used in place of jack screw 66.

One of the advantages of the present invention is that once the spacing between rollers 46 and 62 is adjusted for a given pipe diameter and overbend, it remains constant even as roller 46 is moved inwardly to successive layers of pipe. Rollers 46 and 62 and pivot point 45 define an imaginary triangle which is preferably held constant during operation. Accordingly, fewer adjustments need to be made to the present invention as compared to the prior art systems as successive layers of pipe are removed.

As can be seen from the foregoing, the present invention provides a continuous pipe laying system in which the pipe straightening system is easy to operate, requiring few adjustments during operation. Once the spacing and overbend between the two rollers is fixed, the alignment remains constant even as successive layers of pipe are unwound.

By positioning the inner roller at a point substantially opposite the departure point of the pipe from the reel, the amount of force necessary to remove and straighten the pipe is reduced as compared to the prior art systems. This facilitates the balancing of the forces necessary to remove and straighten the pipe with the forces necessary to create tension in the pipeline as it is being laid across the ocean floor.

It should be appreciated that while the present invention has been particularly described with reference to the presently preferred embodiment, the invention may be embodied in other specific forms without departing from its spirit or essential characteristics. For example, the straightener can be positioned to allow the pipe to be discharged from the top of the reel. Additionally, the first roller can be urged against the pipe by a piston pushing inward with respect to the reel rather than by the method illustrated. Thus, the described embodiment is to be considered in all respects only as illustrative and not restrictive. The scope of the invention is, therefore, indicated by the appended claims rather than by the foregoing description, and all modifications or changes which come within the meaning and range of equivalency of the claims are to be embraced within their scope.

What is claimed is:

1. A continuous marine pipe laying system comprising:
    a pipe reel having a support frame adapted to be mounted on a barge, said reel with pipe coiled thereon defining a pipe support surface;
    a support arm pivotally connected to an axis of rotation of said pipe reel;
    a first pipe straightening roller for forceably engaging said pipe at a location substantially opposite the departure point where the pipe departs the pipe support surface of the reel, a first roller arm supporting said first roller, said first roller arm being pivotally connected to said support arm at a first predetermined point spaced from said axis of rotation of said reel, said first roller including means for maintaining said roller at said location substantially opposite the departure point as successive layers of pipe are removed; and
    a second pipe straightening roller for forceably engaging said pipe on a side of said pipe opposite said first roller at a position to overbend said pipe such that the pipe exerts said pipe laying system in a substantially rectilinear configuration, said roller being mounted on a second roller arm pivotally connected to said support arm at said first predetermined point.

2. A continuous marine pipe laying system as defined in claim 1 further comprising means for maintaining a constant overbend between said first roller and said second roller during operation.

3. A continuous marine pipe laying system as defined in claim 1 wherein said means for maintaining said first roller at said location substantially opposite the departure point comprises an adjustable arm connected to said support arm and to said first roller arm for urging said first roller against said pipe.

4. A continuous marine pipe laying system as defined in claim 3 wherein said maintaining means further comprises a guide beam connected to said support frame and wherein said first roller arm is movably connected to said guide beam.

5. A continuous marine pipe laying system as defined in claim 1 further comprising an adjustable arm positioned between said first roller arm and said second roller arm.

6. A continuous marine pipe laying system as defined in claim 4 further comprising means for adjusting said guide beam so as to change the departure angle of said pipe from said reel.

7. A continuous marine pipe laying system comprising:
    a pipe reel having a support frame adapted to be mounted on a barge such that said reel can rotate about an axis, said reel with pipe coiled thereon defining a pipe support surface;
    a support arm pivotally coupled at one end to said axis;
    a first roller arm pivotally coupled to said support arm at a predetermined point spaced from said axis, said first roller arm supporting a first pipe straightening roller; and
    a second roller arm pivotally coupled to said support arm at said predetermined point, said second roller arm supporting a second pipe straightening roller.

8. A continuous marine pipe laying system as defined in claim 7 further comprising an adjustable arm positioned between said first roller arm and said second roller arm.

9. A continuous marine pipe laying system as defined in further comprising means for maintaining said first roller adjacent pipe coiled on said reel at a point substantially opposite the departure point where the pipe departs the pipe support surface of the reel.

10. A continuous marine pipe laying system as defined in claim 9 wherein said means for maintaining said first roller adjacent said pipe comprises an adjustable arm connected to said support arm and to said first roller arm for drawing said first roller towards said axis.

11. A continuous marine pipe laying system as defined in claim 10 wherein said means for maintaining said first roller adjacent said pipe further comprises a guide beam connected to said support frame and wherein said first roller arm is movably connected to said guide beam.

12. A continuous marine pipe laying system as defined in claim 11 further comprising means for adjusting said guide beam so as to change the departure angle of said pipe from said reel.

13. A continuous marine pipe laying system comprising:
    a pipe reel having a support frame adapted to be mounted on barge such that said reel can rotate about an axis, said reel with pipe coiled thereon defining a pipe support surface;
    a support arm pivotally coupled at one end to said axis;
    a first pipe straightening roller for forceably engaging said pipe at a location substantially opposite the departure point where the pipe departs the pipe support surface of the reel, said roller being mounted on a first roller arm pivotally connected to said support arm at a first predetermined point spaced from said axis of rotation of said reel;

an adjustable arm connected to said support arm and to said first roller arm for drawing said first roller towards said axis to maintain said first roller adjacent the pipe coiled on said reel as successive layers of pipe are removed;

a second straightening roller for forcibly engaging said pipe on a side of said pipe opposite said first roller at a position to overbend said pipe such that the pipe exits said pipe laying system in a substantially rectilinear configuration, said roller being mounted on a second roller arm pivotally connected to said support arm at said first predetermined point; and an adjustable arm positioned between said first roller arm and said second roller arm.

* * * * *

UNITED STATES PATENT AND TRADEMARK OFFICE
CERTIFICATE OF CORRECTION

PATENT NO. : 4,594,871
DATED : June 17, 1986
INVENTOR(S) : Nico de Boer

It is certified that error appears in the above–identified patent and that said Letters Patent are hereby corrected as shown below:

Column 5, line 60, delete "exerts" and insert therefor

--exits--;

Column 6, line 40, after "in" insert therefor

--claim 7--;

Column 8, line 1, after "a second" insert therefor

--pipe--.

Signed and Sealed this

Twenty-third Day of September 1986

[SEAL]

Attest:

DONALD J. QUIGG

Attesting Officer

Commissioner of Patents and Trademarks